July 11, 1950 E. ZURCHER 2,515,159
QUICK OPERATING VALVE
Filed Feb. 12, 1945 2 Sheets-Sheet 1

INVENTOR.
Ernest Zurcher
BY
Robert A. Levender

July 11, 1950 E. ZURCHER 2,515,159
QUICK OPERATING VALVE
Filed Feb. 12, 1945 2 Sheets-Sheet 2

INVENTOR.
Ernest Zurcher
BY
Robert A. Lavender

Patented July 11, 1950

2,515,159

UNITED STATES PATENT OFFICE 2,515,159

QUICK OPERATING VALVE

Ernest Zurcher, Knoxville, Tenn., assignor, by mesne assignments, to the United States of America as represented by the United States Atomic Energy Commission Application February 12, 1945, Serial No. 577,383

6 Claims. (Cl. 137—139)

This invention is concerned with valves and valve actuating mechanism and particularly with a valve actuating mechanism which is quick acting and which is adaptable for use with relatively large valves designed for and employed in systems operating under relatively high degree of vacuum.

An object of the invention is to provide a valve actuating mechanism for a relatively large valve whereby the valve can be relatively quickly moved between a fully closed position and a wide open position.

Another object of the invention is to provide a valve of the type referred to in the previous object wherein the valve is operated by a crank which moves between top and bottom dead center positions, these two positions determining the fully closed and fully open positions of the valve.

Another object of the invention is to provide a valve actuator consisting of a crank and pitman which form a toggle joint with one of the toggle members resiliently mounted so that the resiliency permits the toggle joint to move over center after the valve seats.

Another object is to provide a valve actuating arrangement as in the previous object wherein the one toggle member is mounted on a shaft or pivot which is mounted so as to be rotatable about another center and resilient means are provided to resist rotation about the other center.

Figures 1, 2:
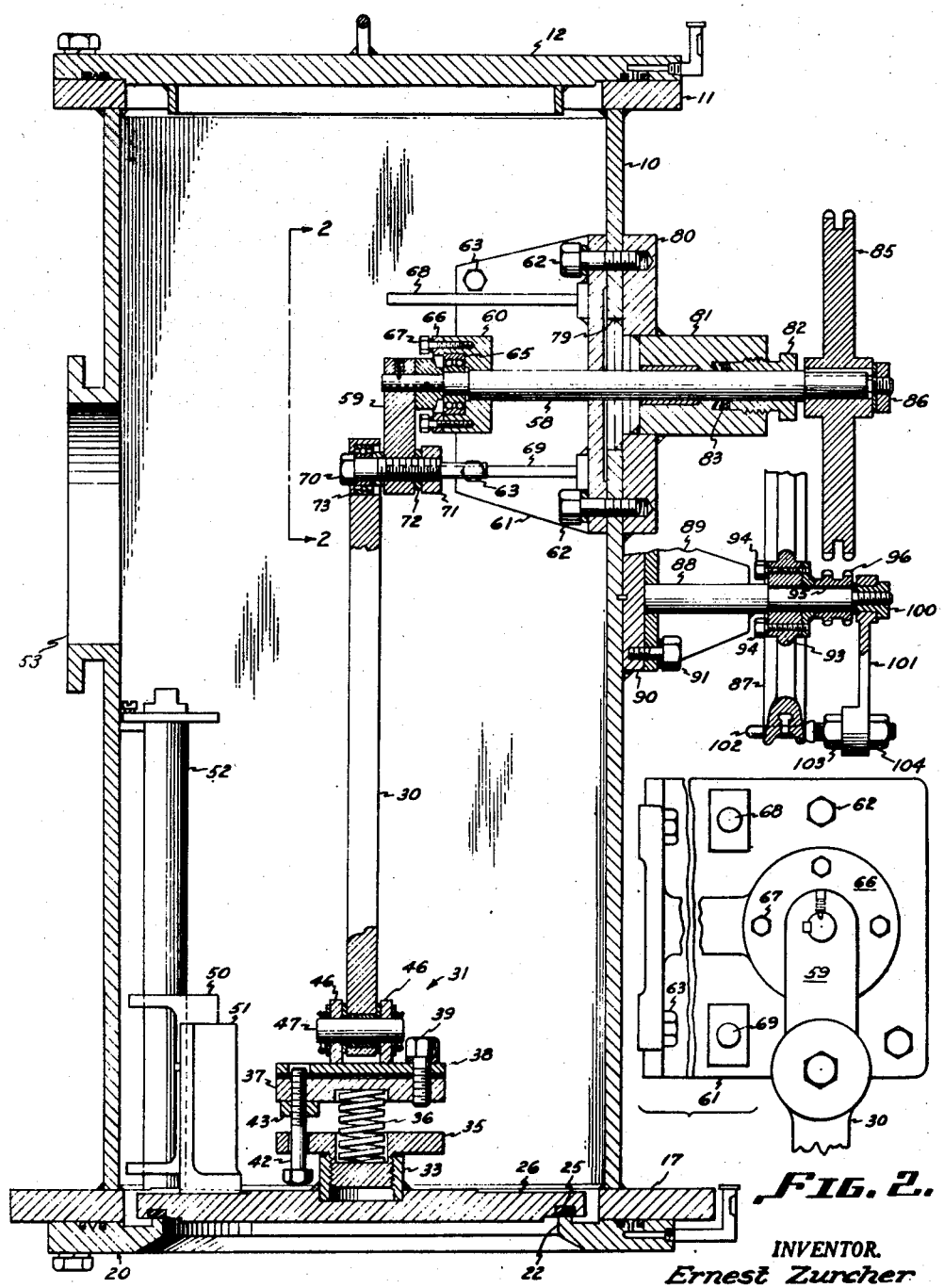

Further objects of my invention and numerous of its advantages will become apparent from the following detailed description and annexed drawing wherein Fig. 1 is a cross sectional view of the first embodiment of my invention.

Fig. 2 is a view of a detail taken along the line 2—2 of Fig. 1.

Figure 4:
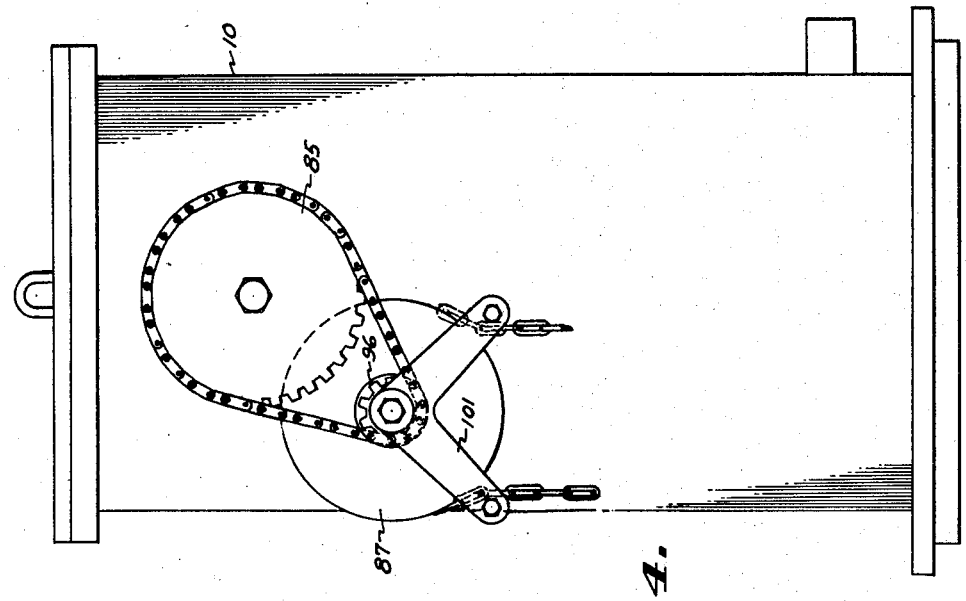
Figure 3:
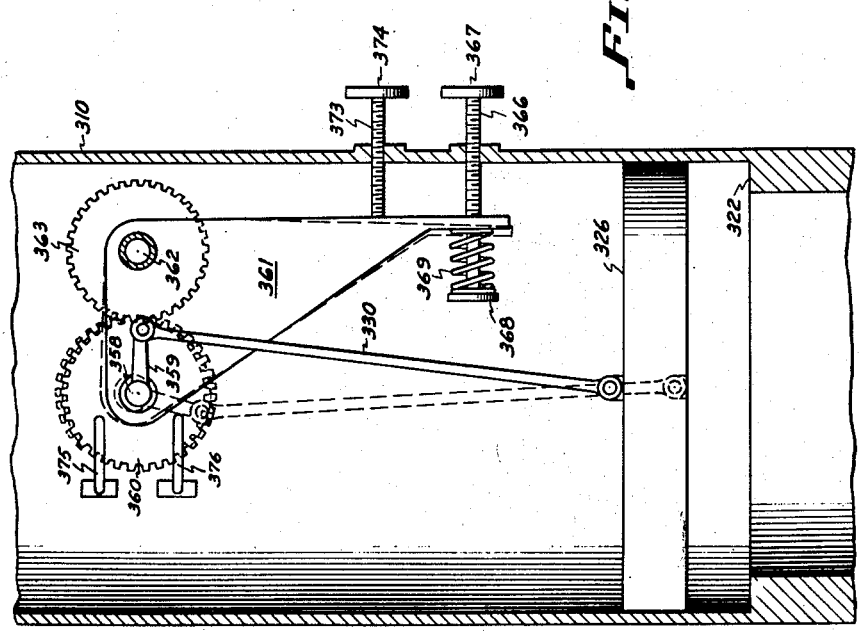

Fig. 3 is a sectional diagrammatic view of a second embodiment of my invention. Fig. 4 is an exterior view of the operating mechanism of the valve of Fig. 1. Referring to Fig. 1 of the drawings, a cross sectional view is shown of a valve embodying the actuating mechanism of my invention. The valve is mounted for use primarily in vacuum systems which employ oil diffusion pumps and the particular valve of my invention finds great adaptability for use on the discharge side or the outlet of pumps of this type. It is sometimes desirable or necessary that the outlet or discharge of an oil diffusion pump be closed relatively quickly, necessitating that the valve be moved from fully open to fully closed position quickly. The arrangement of my invention provides that this can be done conveniently. The valve is shown as comprising a valve housing or body 10 which is square in horizontal cross section, and which is closed at the top by a flange member 11 which may be welded to the housing or casing 10, and a cover plate 12 that may be attached to the flange member 11 by suitable cap screws as shown. If desired, suitable seals may be provided between the periphery of member 12 and the member 11, as shown.

The bottom of the housing or casing 10 is attached to a flange member 17 such as by welding, and to the member 17 is secured a member 20 having a circular valve port therethrough, the member 20 being secured to the member 17 by cap screws extending through the members as shown. Suitable sealing means may be provided between the members 17 and 20 as shown. The periphery of the port through the member 20 forms an upstanding flange 22 as shown forming a valve seat which engages with a valve seating ring 25 carried in a corresponding recess in a valve disc or valve member 26.

The valve disc 26 is mounted on an assembly 31 which is attached to a stem 30 and which forms a resilient connection between the stem 30 and the disc 26. The assembly 31 includes a circular internally screw threaded fitting 33 which seats in a central recess in the upper side of valve disc 26 and is attached thereto by welding. Engaged in the fitting 33 is a flange nut 35 which has a central bore or spring retaining recess as shown. Fitting in the recess in the member 35 is a coil spring 36, the other end of which engages in a spring retaining recess in a disc or plate member 37 which is attached to another disc or plate member 38 by means of a cap screw 39 as shown. The spring 36 is normally under compression, as will presently be described, tending to urge the members 35 and 37 away from each other and such movement is limited by a cap screw 42 which extends through an opening in the flange of member 35 and screws into member 37 and is locked by a lock nut 43 on the screw 42 adjacent member 37 as shown to lock it in position after it is adjusted.

Upstanding from the disc member 38 and attached thereto by welding or the like are brackets or ears 46 so as to form a yoke between which is pivoted the lower end of stem 30, the stem being on a shaft or pivot 47, and the shaft being held in place by cotter pins, as shown, and ears 46 being spaced from the parts on either side of the ears by washers as shown. From the foregoing it can be seen that when the valve stem 30 is forced downwardly the valve disc 26 will seat and further downward movement of stem 30 will cause the coil spring 36 to be compressed. Expansion of the coil spring 36 is limited by the head of cap screw 42 engaging the flange of member 35.

Up and down movement of the valve is guided by a sleeve-like guide member 50 which is attached to the valve disc 26 by member 51 and which slidably engages on a vertical guide stem or post 52 supported inside of the valve housing 10. Guide stem 52 is in a corner of casing 10 so as not to obstruct movement of disc 26.

The outlet of the valve casing 10 is shown at 53 and the outlet may be connected to mechanical pumps which connect to the discharge of the diffusion pump, the outlet of which is controlled by the valve of Fig. 1.

The valve is actuated by means of an operating shaft 58 which extends through a side wall of the casing 10 and at the end of which inside of the casing is a crank arm 59 attached to the end of the shaft by a set screw as shown. The shaft 58 is journalled in a pedestal bearing 60 supported from a bracket 61 attached to the side wall of the casing 10 by cap screws 62 and 63 as shown. The pedestal bearing includes a ball bearing 65 which is held in place by ring member 66 and cap screws 67. Members 68 and 69 designate stops for crank arm 59 as will presently be described. They are attached to bracket 61.

The stem or pitman 30 is attached to the crank 59 by a bolt 70 which passes through the upper end of the stem 30 and through the end of crank 59 being secured thereto by a nut 71 and lock washer 72. Mounted at the upper end of the stem 30 is a ball bearing 73 through which the bolt 70 passes, the bolt formig a shaft about which the stem 30 with the ball bearing 73 at its upper end can freely rotate.

The shaft 58 passes through an opening 79 in the side wall of the casing 10 and adjacent this opening there is secured a ring member 80 by means of welding and also by means of the cap screws 62 which screw into it. The member 80 has a central opening for the reception of the end of a sleeve or bearing member 81 through which the shaft 58 passes, the member 81 having a Wilson seal in its right end comprising a screw threaded packing nut 82 which when turned down compresses the packing members and spacer members 83 as shown. These members are of the type ordinarily used with Wilson seals. At the end of the shaft 58 is secured a sprocket wheel 85 by means of a nut 86 engaging the end of shaft 58, the wheel 85 being of the type adapted to have a chain pass around it in the manner of a belt. Numeral 87 indicates a wheel or pulley mounted on a shaft 88 which is supported from the side wall of casing 10 by means of a bracket 89 welded to a plate 90, and is also secured thereto by cap screws as shown at 91, the plate 90 being welded to the side wall of the casing 10. Pulley 87 has a peripheral groove adapted to have a chain fit in it as in Fig. 4. The hub 93 of the pulley 87 is attached by cap screws 94 to a member 95 which is in turn welded to a smaller sprocket wheel 96 also mounted on the shaft 88 and which is aligned with the wheel 85 so that a sprocket chain may pass around the wheels 85 and 96. See Fig. 4. Secured to the end of shaft 88 by a ring nut 100 is a bracket 101 having two downwardly extending arms (see Fig. 4) and to each of these arms there is attached a guide finger or member 102 as shown, each of which is in a position adjacent the wheel 87 to act as a guide for a chain, that is, a loop of chain which passes around the wheel 87 so that it can be rotated by hand. The chain passes between the members 102 and the wheel 87 so as to prevent the chain from slipping off the wheel. The guide members 102 screw into the ends of the arms of bracket 101 and are held in place by lock nuts 103 and 104.

In operating the valve the operator grasps the chain which passes around the wheel 87 and by pulling one side or the other of the chain the wheel 87 is rotated and sprocket wheel 96 in turn rotates the sprocekt wheel 85 by means of the chain passing over these wheels. Rotation of shaft 58 in turn rotates the crank 59 for opening the valve, lifts the stem 30 upwardly, the crank 59 rotating in a counter-clockwise direction looking at Fig. 2 for opening the valve. When the crank 59 reaches top dead center position the valve is in fully open position and the crank is allowed to go just past top dead center against the stop 68 where the parts remain with the valve fully opened. The stop 68 holds the valve positively in open position preventing continued movement of the crank in counter-clockwise direction and when the parts reach this position the operator can, of course, feel it through the chains by which the valve is operated.

When it is desired to close the valve, the chains passing around the wheel 87 are manipulated to rotate the wheel 87 and the shaft 58 in the opposite direction, that is, in a clockwise direction and the crank 59 is now moved back over top dead center position allowing the valve to drop down under its own weight until it seats on the seat 22. Manipulation of the chains is continued, continuing rotation of shaft 58 until the crank 59 passes over dead bottom position and slightly beyond against the stop as shown on Fig. 2. When the crank 59 moves over bottom dead center position, since the valve has seated, there is of course, a thrust in stem 30 and the spring 36 is necessarily compressed somewhat as the crank passes over bottom dead center against the stop. The bottom dead center position of the crank determines substantially the closed position of the valve just as the top dead center position of the crank determines the open position. That is, the operator is able to feel it in the chains when the valve is fully closed.

From the foregoing it is to be seen that the valve can be manipulated between fully open and fully closed positions by rotating the shaft 58 through an arc of slightly more than 180°. Thus, the valve can be quickly operated by manipulating the chains passing around the wheel 87 and the operator is readily aware as to when he has the valve in fully closed and fully open position.

Referring to Fig. 3 of the drawings, a second embodiment of my invention is shown wherein means are provided to accurately determine and adjust the seating pressure of the valve. In Fig. 3 the valve casing is shown at 310 as a cylindrical casing, and the valve disc 326 is associated with a seat 322. The invention of this embodiment is shown diagrammatically but it will be understood that the valve casing and valve seat may be constructed substantially as shown in Fig. 1. The valve casing may be square as in the previous embodiment. The valve disc 326 is connected to a stem 330, the upper end of which is pivoted to the end of a crank 359 connected to a shaft 358 which is rotatable by a gear 360. The shaft 358 is journalled in one arm of a bell crank lever 361 which is mounted to rotate or pivot about a shaft 362 mounted within the casing 310. Also mounted on the shaft 362 and rotatable with the shaft is a gear 363 which meshes with and drives the gear 360. The shaft 362 is rotatable from outside the casing 310 the same as shaft 58 in Fig. 1. The other arm portion of the bell crank lever 361 extends downwardly and through the lower end of it passes a manually adjustable screw 366 having a knob 367 on its end exterior of the casing 310. On the inner end of screw 366 is a spring retainer 368 and between the retainer 368 and the lower end of bell crank lever 361 is a coil spring 369 which is normally under compression. Rotation of the bell crank lever 361 to the right, that is, in a counter-clockwise direction, is limited by a limit stop screw 373 adjustable by means of a knob 374 outside of the casing 310. Numerals 375 and 376 designate stops for crank arm 359.

With the parts in the position shown in Fig. 3, the valve is in an intermediate position approximately half-way between fully closed and fully open position. In operation the crank 359 operates between a position past bottom dead center position and past top dead center position as in the previous embodiment. It will be seen that the crank 359 and the stem or pitman 330 form a toggle joint which passes over center both when the valve is operated to fully closed position and when it is operated to fully open position. In operation of the valve from the position in which it is shown to closed position, the disc 326 moves downwardly and the crank 359 rotates in a clockwise direction until the parts reach the dotted line position with the crank 359 against the stop 376 as shown. During this operation the weight of the valve while moving downwardly will tend to move the bell crank lever 361 in a counter-clockwise direction so the bell crank lever will remain against the stop formed by screw 373 until the crank 359 approaches bottom dead center position. At this point the valve disc 326 will seat, that is, it seats before the crank 359 passes over bottom center position. After the valve seats continued downward movement of stem 330 will, of course, be resisted and some force will be required to rotate the shaft 362 in a counter-clockwise direction to complete closure of the valve. Rotation of the gear 363 in a counter-clockwise direction operates to rotate the gear 360 in a clockwise direction and similarly crank 359 will rotate in a clockwise direction. Since downward movement of stem 330 is now resisted, the valve disc 326 having seated, rotation of crank 359 in a clockwise direction will produce a thrust in the stem 330 and as the rotation of gear 360 attempts to straighten out the knee formed by crank 359 and stem 330, the result will be that shaft 358 will tend to move upwardly, that is, the thrust reaction in stem 330 will be such that the bell crank lever 361 will start to rotate in a clockwise direction and its lower end will begin to compress the spring 369. As the crank 359 passes over bottom dead center position the spring 369 will be compressed the maximum amount and as the crank passes over dead center against the stop 376 some of the compression in the spring 369 will be released. From the foregoing it can be seen that the seating pressure of the valve and correspondingly the force required to fully close it, that is, to fully seat it will depend upon the adjustment of spring 369 by knob 367.

To open the valve the shaft 362 is rotated in a clockwise direction and thus gear 363 rotates gear 360 in a counter-clockwise direction so that crank 359 moves in a counter-clockwise direction away from the dotted line position past bottom dead center position and around towards and over top dead center position. As the crank 359 moves from bottom dead center position to top dead center position the weight of the valve disc 326 will be suspended from the shaft 358 so that the bell crank lever 361 will be held in a counter-clockwise rotated position against the stop formed by screw 373. As the crank 359 moves over top dead center against the stop 375 the valve disc 326 will move downwardly slightly again from its highest point and will be held there by the stop. The weight of the valve continues to hold the bell crank lever 361 in a counter-clockwise rotated position against the stop formed by screw 373.

From the foregoing it can be seen that in operating the valve the toggle joint formed by members 359 and 330 operates over center to close the valve and also over center in opening the valve, the resiliency of the spring 369 permitting the toggle joint to pass over center after the valve has seated. The adjustment of the spring 369 determines the seating pressure of the valve and correspondingly the force necessary to close it.

From the foregoing those skilled in the art will observe that I have provided an efficient mechanism whereby a large valve can be quickly operated between fully open and fully closed positions and that the two positions are positively predetermined by the nature of the actuating mechanism. The embodiment of Fig. 3 provides a convenient manner for determining and adjusting the seating pressure of the valve.

The embodiments of my invention which I have disclosed herein are illustrative of its preferred forms and it is intended that the disclosure be interpreted in an illustrative rather than a limiting sense, the limitations on the invention to be determined in accordance with the scope of the claims appended hereto.

I claim:

1. In apparatus of the character described in combination, means forming a valve body including a seat, a valve within said valve body, operating mechanism within the valve body including means comprising a shaft extending through a side wall of said valve body, a crank rotatable by said shaft and a valve stem connected to said crank and said crank being rotatable past dead center in one direction to move the valve away from the operating mechanism and engage the seat and past dead center in the other direction to disengage the valve, and resilient means interposed between the valve and valve stem so compressible to permit the crank to rotate past dead center position after the valve seats.

2. In apparatus of the character described in combination, means forming a valve body, a valve within said valve body, operating mechanism within the valve body including means comprising a shaft extending through a side wall of said valve body, a crank rotatable by said shaft and a valve stem connected to said crank and said crank being rotatable past dead center in one direction to open the valve and past dead center in the other direction to close the valve and resilient means interposed between the stem and valve to permit the crank to rotate past dead center position after the valve seats, said resilient means comprising a compressible resilient mounting for said crank, the compressibility of the mounting permitting the crank to move past dead center after the valve seats.

3. A valve actuating mechanism comprising in combination, means forming a toggle joint, a shaft, one of the toggle members being mounted on said shaft so as to be rotatable, the parts being so constructed and arranged that the said one toggle member is rotatable in one direction past over center position to close the valve and is rotatable in the other direction past over center position to open the valve and means providing a resilient mounting for said shaft so that the toggle joint can move over center after the valve seats, said resilient mounting comprising a pivoted arm carrying said shaft and a resilient device for restraining movement of said arm in one direction, and means comprising a driving gear rotatable about the same center as said pivoted arm and a driven gear on said shaft and meshing with said driving gear.

4. A combination of the character described comprising a valve body, a valve within said valve body, operating mechanism within the valve body including a shaft extending through the wall of said body, a crank, a valve stem joining said crank to said valve, said crank being rotated by said shaft past upper dead center to open the valve and past lower dead center to close the valve, means engageable with said crank to limit the movement thereof past upper and lower dead center to lock it in position, and resilient means interposed between the valve stem and valve to provide a compressible connection between them for permitting movement of said crank past lower dead center.

5. A combination of the character described comprising, a valve body, a valve within said body, operating mechanism within the body including a shaft extending through the wall of said body, a crank mounted on the shaft, a valve stem connecting said crank to said valve, said crank being rotatable by said shaft past upper dead center to open the valve and past lower dead center to close it, resilient means interposed between the valve stem and valve to permit movement of the crank past lower dead center position, means engageable with the crank to limit the movement of the crank past dead center position, a gear train for actuating said shaft, flexible means for manually operating said gear train, and guides for said flexible means.

6. A combination of the character described comprising a valve body providing a seat, a valve disposed within the body and engageable with said seat, operating mechanism within the valve body including a shaft extending through the wall of the body, a crank mounted to rotate with the shaft, a valve stem pivoted adjacent one end on the crank and joined through resilient means to the valve, said resilient means including a compression element interposed between the valve and the stem and a compression limiting element bridging said valve and said stem for movably securing them together whereby to permit movement of the crank past dead center while the valve is in seating position.

ERNEST ZURCHER.

REFERENCES CITED

The following references are of record in the file of this patent:

UNITED STATES PATENTS

| Number | Name | Date |
|---|---|---|
| 840,954 | Pinkerton | Jan. 8, 1907 |
| 956,103 | Kelly | Apr. 26, 1910 |
| 1,368,229 | Chrisman | Feb. 8, 1921 |
| 1,380,867 | Bolotoff | June 7, 1921 |
| 1,571,039 | Bayer | Jan. 26, 1926 |
| 1,591,228 | Obenhaus | July 6, 1926 |
| 1,606,484 | Shimp | Nov. 9, 1926 |
| 1,702,479 | Mosch | Feb. 19, 1929 |
| 1,724,714 | Kersten | Aug. 13, 1929 |
| 2,166,304 | Laurent | July 18, 1939 |
| 2,312,290 | Smith | Feb. 23, 1943 |

FOREIGN PATENTS

| Number | Country | Date |
|---|---|---|
| 537,462 | Great Britain | June 24, 1941 |